United States Patent [19]

Andoh

[11] 4,365,538

[45] Dec. 28, 1982

[54] VACUUM OPERATABLE DIFFERENTIAL SERVO-MOTOR

[75] Inventor: Masamoto Andoh, Toyota, Japan

[73] Assignee: Aisin Seiki Kabushiki Kaisha, Aichi, Japan

[21] Appl. No.: 187,075

[22] Filed: Sep. 15, 1980

[30] Foreign Application Priority Data

Sep. 21, 1979 [JP] Japan .............. 54-131728[U]

[51] Int. Cl.³ ............................................ F01B 25/26
[52] U.S. Cl. ......................................... 91/1; 92/5 R; 92/107; 60/534; 200/83 R
[58] Field of Search ............ 91/1; 92/5 R, 107; 60/534, 535; 200/83 R

[56] References Cited

U.S. PATENT DOCUMENTS

| | | | |
|---|---|---|---|
| 3,293,849 | 12/1966 | Smith | 60/534 |
| 3,303,755 | 2/1967 | Linker | 91/1 |
| 3,362,298 | 1/1968 | Julow | 91/1 |
| 3,453,937 | 7/1969 | Haberman | 91/1 |
| 3,648,568 | 3/1972 | Wright | 92/5 R |
| 3,661,053 | 5/1972 | Rich | 92/5 R |
| 3,835,753 | 9/1974 | Bunyard | 92/5 R |

*Primary Examiner*—Abraham Hershkovitz
*Attorney, Agent, or Firm*—Oblon, Fisher, Spivak, McClelland & Maier

[57] ABSTRACT

A vacuum operable differential servo-motor adapted for use on motor vehicles to operate, for example, an anti-skid brake control system, a brake booster and the like, including a housing, a power piston movable therein and dividing the interior of the housing into two chambers one on each side of the power piston, a conduit member fluidly connecting one of the chambers to an engine intake manifold, a solenoid valve for controlling a pressure differential between the chambers in response to an input signal and a failure sensing switch member having a casing outside of the housing and a plunger operatively connected to the power piston and a diaphragm seal member with its peripheral bead clamped between the casing and the housing with a central portion being sealed to the plunger.

6 Claims, 2 Drawing Figures

VACUUM OPERATABLE DIFFERENTIAL SERVO-MOTOR

BACKGROUND OF THE INVENTION

Field of the Invention

This invention relates to vacuum operable differential servo-motor used to operate, for example, the known hydraulic brake system, anti-skid brake control systems and the like for use on motor vehicles.

Description of the Prior Art

Differential servo-motors as they are known conventionally in the art, usually include a housing having a movable wall structure or piston positioned therein for reciprocable movement in the housing, the movable wall structure dividing the housing into two compartments, one on each side of the movable wall. The compartments are usually in fluid communication with an engine intake manifold for obtaining the vacuum pressure from the engine intake manifold.

In order to sense any failure of the movable wall for safety purposes, an electric switching member is employed in the prior art in engagement with the movable wall.

There exists however a tendency of ingress of evaporated fuel from the engine intake manifold into the compartments and hence into the switch member, since the switch member is outside of the housing and the operative connection is achieved across a wall portion of the housing with the movable wall in the housing. This tends to cause a danger of explosion of the fuel vapor due to a spark of the electric switch member.

In order to avoid such danger, many switch members have employed complicated sealing mechanisms to isolate the interior of the switch members from the compartments of the housing. This attained the safety purpose successfully but undesirably for decreasing the substantial manufacturing costs.

SUMMARY OF THE INVENTION

It is a general object of the present invention to provide a cheaper failure sensing switch member adapted to a servo-motor by a provision of a diaphragm seal member interposed between a housing of the servo-motor and the switch member. This results in a sealing ability not only to prevent the switch member from any tendency of ingress of fuel vapor from the housing but from another tendency of ingress of dirt and moisture from the outside.

It is another object of the invention to provide a servo-motor in which the switch has a plunger extending into the housing of the servo-motor to engage the wall member and sealed by the diaphragm seal member against ingress of fuel vapor, dirt and wetness.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
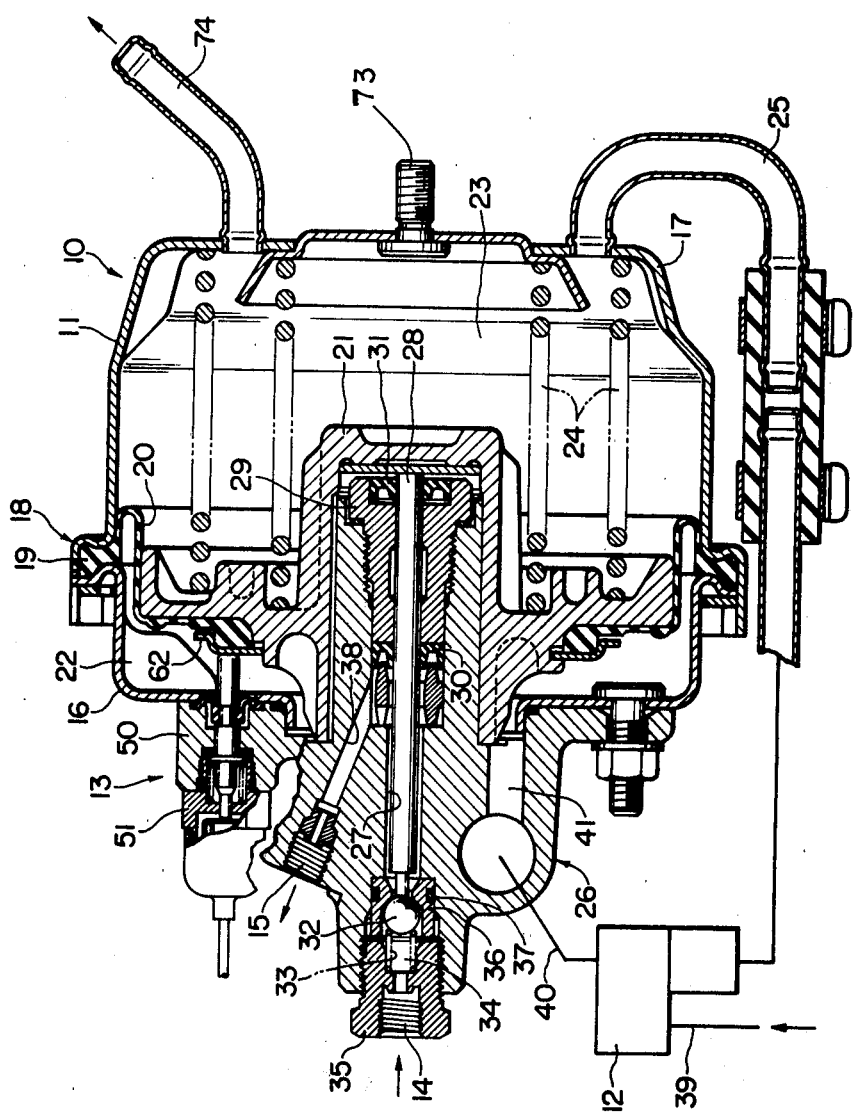
FIG. 1 is a longitudinal sectional view through the servo-motor with the failure sensing switch member shown in another longitudinal cross section.

With regard to FIG. 1 there is shown a servo-motor 10 having a motor housing 11, solenoid valve 12 and a failure sensing switch member 13. The servo-motor 10 is in fluid communication through a port 14 to a brake master cylinder (not shown) that is mounted in a vehicle to be operated by a brake pedal (not shown). The master cylinder as thus constituted, provides braking pressures directly to front wheel brake actuators (not shown) and the servo-motor 10 which is connected by a port 15 to the rear wheel brakes (not shown), respectively.

With particular regard now to the axial cross sectional view in FIG. 1 the housing 11 is more clearly depicted to involve a front shell 16 and a rear shell 17 joined, as by twist lock assembly 18 with a peripheral bead 19 of a rubber rolling diaphragm 20 interposed for sealing the puncture of the shells 16 and 17. The diaphragm 20 has at its central portion a movable wall 21 or power piston sealed thereto. The diaphragm 20 and the wall 21 cooperate to divide the housing 11 into two chambers 22 and 23.

Compressed coiled springs 24 are installed within the rear shell 17 or chamber 23 so that it normally urges the wall 21 to the left when installed. The chamber 23 is in communication through an inlet 74 with an engine intake manifold (not shown) and also in communication through a conduit 25 with the solenoid valve 12. The shell 16 has in its inside face projected a hub assembly 26 sealingly secured to the outside of the shell 16, thereby sealing against fluid flow between the outside and inside of the chamber 22.

On the hub assembly 26 is slidably supported the movable wall 21. Axial support for the movable wall 21 is occasioned by the cylindrically projecting hub assembly 26 that extends into the chamber 22. The hub assembly 26 includes bore 27 for the receipt of plunger 28 which is in slidable and sealing engagement with a plug 29 by means of cup seal members 30 and 31 preventing hydraulic fluid flow out of the bore 27 into the chamber 22. The rod or plunger 28 is normally at its left end in abutment relation with a ball 32 by means of a compressed coil spring 33 in a chamber 34 with its left end anchored to a plug 35 and right end anchored to the ball. The plug 35 is threaded to be screwed into a tapped bore of the body of the hub assembly 26 for retaing a seat member 36 between the plug 35 and the bottom end of the bore 34 in sealed relation with the bore by means of seal member 37 to prevent fluid flow along the periphery of the seat member 36.

The chamber 34 is connected through the port 14 and a conduit (not shown) to the master cylinder. The bore 27 is in fluid communication through a passage 38 and port 15 with the rear wheel brake actuators (not shown).

The solenoid valve 12 is in communication as shown in phantom through a conduit 39 with atmosphere while being in communication through a conduit 40 and a passage 41 with the chamber 22 in the housing 11.

From the foregoing description, it will be apparent that the movable wall 21 reciprocates within the housing 11 in sliding engagement with the hub assembly 26 as a result of a pressure differential being applied to opposite sides of movable wall 21 as will be described in greater detail hereinbelow.

The movable wall 21 or piston and all other parts are retained in the positions shown in FIG. 1 of the drawings in the normally retracted position of the servo-motor.

In the positions, fluid pressure developed in the master cylinder is transmitted directly to the front wheel brake actuators and also to the rear wheel brake actuators through port 14, bore 27, passage 38 and port 15. In the condition, the chambers 22 and 23 in the housing 11 are in fluid communication with each other through conduit 25, solenoid valve 12, and conduit 40 so that wall 21 is retained in the position shown, by means of the compressed springs 24.

Whenever the braking pressure is developed in the rear wheel brake actuators to approach a value that will lock the brake of the rear wheels, the sensor (not shown) will call upon the computer system (not shown) to provide a signal to the solenoid valve 12 to energize. This terminates the communication between the chambers 22 and 23. Air entering the chamber 22 creates an unbalanced force across the diaphragm 20, which forces diaphragm 20 and wall 21 together to the right against its biasing springs 24 to a new equilibrium position. A displacement rod 28 or plunger is normally urged by fluid pressure in the chamber 27 to the right and extends through seat 36 to abut against valve ball 32. With diaphragm 20 all the way to the right corresponding to a signal repetition rate, valve ball 32 is seated to the seat 36 interrupting communication of hydraulic brake fluid from the master cylinder through valve seat 36, chamber 27, passage 38, and port 15 to the rear wheel brake actuators. As the pulse or signal repetition rate increases, diaphragm 20 moves to the right to a new equilibrium position, thereby moving the rod 28 to the right and allowing spring 33 to force ball 32 against seat 36, thereby isolating the master cylinder from the rear wheel brake actuators and trapping a fluid pressure in the rear wheel brake actuators.

As the pulse repetition rate increases still further, diaphragm 20 moves further to the right, carrying the rod 28 to the right. Chamber 27, whose right edge is defined by gasket or seal 30 increases in volume causing the hydraulic fluid pressure trapped in the rear wheel brake actuators to attenuated. At maximum pulse repetition rate, diaphragm 20 has moved as far to the right as possible and the volume of chamber 27 has increased to the point where the fluid pressure in the wheel cylinder has been completely relieved and the brake released of course. As the pulse repetition rate now decreases, the diaphragm returns to the left, first forcing the hydraulic fluid back into the wheel brake actuators and finally when the pulse repetition rate has decreased sufficiently, lifting ball 32 from seat 36 once again permitting free communication from the master cylinder to the wheel cylinder. It can thus be seen that brake pressure is related to wheel deceleration, being proportional to wheel deceleration in a critical band of wheel deceleration.

Figure 2:
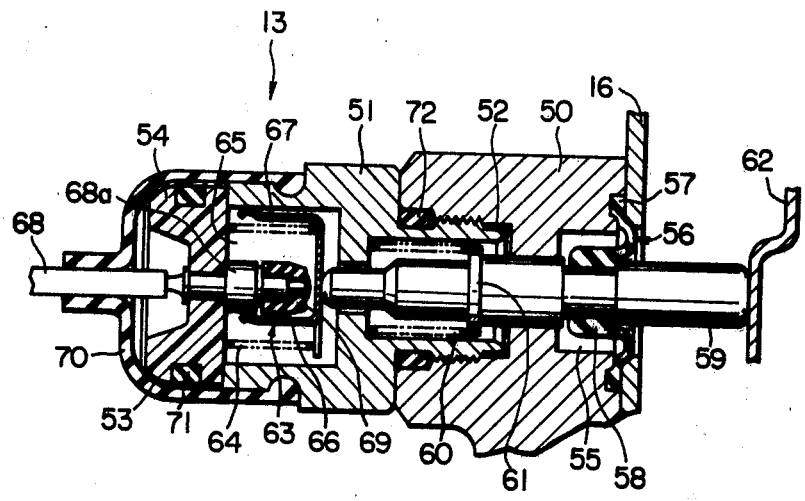
FIG. 2 is an enlarged view of a portion of the mechanism shown in FIG. 1.

The failure sensing switch member 13 is described in greater detail with particular regard to the axial cross sectional view in enlarged scale in FIG. 2. A first body 50 is casted integral with the hub assembly 26 shown in FIG. 1. A second body 51 is threaded to be screwed into a tapped bore of the body 50 as shown as at 52. The second body 51 has a thin cylindrical wall portion 53 to hold a plug 54 therein by calking technique. The plug 54 is made of synthetic resin material of electrically insulating character.

The first body 50 has a recessed portion 55 within which is a diaphragm seal member 56. The rubber rolling diaphragm seal member 56 presents minimal resistance upon deformation and has its peripheral bead 57 interposed for sealing the juncture of the first body 50 and the shell 16 of the housing 11 (FIG. 1). The diaphragm sealing member 56 has at its central portion a tubular portion 58 sealed to a plunger 59 and allows smooth reciprication of the plunger due to its bellows-like flexibility. The plunger 59 is a sliding fit in a central bore of the first body 50 and normally urged to the right by a compressed spring 60 which is captive in the threaded portion 52 of the second body 51. The spring 60 is anchored at the right end to a flange 61 of the plunger 59 while at the other end to the shoulder portion of the second body 51. Plunger 59 is normally in contact engagement at the right end with a retainer 62 of the piston 21, while the other end extends through a central bore of the second body 51 in loose fit therein to abut against a movable terminal 63. The movable terminal member 63 is captive within a cavity 65 of the second body as shown. In the cavity 65 is a compressed spring 64 between the terminal member 63 and the plug 54 to thereby normally urge the terminal member 63 against the left end of the plunger 59. The movable terminal member 63 has a plurality of outer fingers 67 and a plurality of internal fingers 66 of resilient character. The fingers 66 are resiliently engaged with a stationary terminal 68 extending into the cavity 65 of the second body 51 while the outer fingers 67 are resiliently engaged with the internal face of the cavity 65 of the second body 51. The stationary terminal member 68 has a rubber electrically insulating cap 69 at its extremity in the cavity 65. The cap 69 partially covers the stationary terminal 68 with the remainder of the external face exposed or revealed in the cavity 65 for contact engagement with the fingers 66 as shown. The numeral 70 designates a rubber boot for the interior of the switch assembly 13 to be freed from a tendency of dirt. The numerals 71 and 72 designate respectively sealing rings to prevent the interior of the assembly from dirt and wetness.

From the foregoing arrangements the switch member 13 operates as described below.

The plunger 59 and the retainer 62 are all retained in the positions shown in FIG. 2 of the drawings in the normally retracted position of the servo-motor.

In the positions, the movable terminal member 63 holds its fingers 66 in contact engagement with the exposed metallic surface of the stationary terminal member 68 as shown with the outer fingers 67 being normally in contact with the second body 51. Electric conductivity is therefore ensured between the stationary terminal member 68 and the movable terminal members 63 and hence, in the sequel, the vehicle body through the second body 51, first body 50, housing shell 16 and a vehicle body part to which is bolted the shell 16 by means of bolts 73.

The conductivity is blocked in the case of rightward movement of the movable terminal member 63 with the fingers 66 disengaged from the exposed surface 68a of the stationary terminal member 68 and engaged with the insulating cover 69. The rightward movement of the terminal member 63 takes place in dependency upon rightward movement of the diaphragm piston 21 together with the retainer 62 and hence the plunger 59.

In the antiskid operation of the servo-motor 10, the power piston 21 tends to flutteringly reciprocate as described in the foregoing and hence the movable terminal member 63 is caused to flutteringly reciprocate through the plunger 59. Conductivity is therefore alternated with non-conductivity between the stationary and movable terminals 68 and 63 synchronously with the power piston 21. Unusual or failure of operation of the piston or wall member 21 is accordingly sensed by monitoring the failure sensing switch member 13 by means of any known visible or audio means. The switch member 13 is thus used in sensing the condition of the servo-motor 10 for safety purpose of brake application.

The diaphragm seal member 56 is effective to prevent any tendency of ingress of the fuel vapor into the switch member from the chamber 22 of the housing 11, thus avoiding an explosion of the fuel vapor due to a spark of the switch member 13. It will be noted that the chamber 22 of the housing 11 tends to give admission of the fuel vapor, particularly when in case of the known engine accidental stop of the vehicle, from the engine intake manifold.

The diaphragm seal member 56 is also effective to prevent the interior of the switch member 13 from wetness or dirt outside of the switch member 13.

Obviously numerous modifications and variations of the present invention are possible in light of the above teachings. It is therefore to be understood that within the scope of the appended claims, the invention may be practiced otherwise than as specifically described herein.

What is claimed is:

1. A vacuum operable differential servo-motor for a motor vehicle having an engine intake manifold comprising:
   a housing;
   a power piston movable within said housing;
   first and second chambers positioned in said housing one on each side of said power piston;
   means for fluidly connecting said first chamber to said engine intake manifold;
   means for controlling a pressure differential between said first and second chambers including an air passage disposed between said first and second chambers and an electromagnetically operable solenoid valve for closing said air passage and admitting air to said second chamber in response to a signal;
   a failure sensing switch means for detecting operation of said power piston so as to sense any failure or unusual operation of said power piston;
   wherein said failure sensing switch means further comprises a casing disposed outside of said housing;
   a stationary terminal member and a movable terminal member engageable with each other
   a plunger for abutting said power piston and for operatively connecting said movable terminal member to said power piston in said housing; and
   a diaphragm seal member having a peripheral bead and a central portion formed so as to effect minimal resistance against reciprocation of said plunger, said bead being retained between said casing of said switch means and said housing, said central portion of said diaphragm seal member being sealed to said plunger.

2. A servo-motor according to claim 1, wherein said casing of said failure sensing switch means further comprises a first body, a second body and a plug joined in series together to form as a unit said casing said plug being formed of an insulating synthetic resin material for retaining said stationary terminal member in an electrically insulating condition from said casing.

3. A servo-motor according to claim 1, wherein said power piston further comprises a blind bore formed therein and said housing further comprises a hub assembly projecting into said housing for close sliding fit engagement, normally, with said blind bore to thereby sustain said power piston movably in said housing in accordance with said pressure differential developed across said power piston.

4. A servo-motor according to claim 2, wherein said first body of said casing is casted in integral with said hub assembly and cooperates with said housing to clamp therebetween said bead of said diaphragm seal member for sealing against fluid flow between said casing and the interior of said housing.

5. A servo-motor according to claim 1, further comprising a first spring member disposed between said plunger of said switch means and said casing of said switch means for normally urging said plunger toward abutment against said power piston and further comprising a second spring member disposed within said casing for normally urging said movable terminal member toward abutment against said plunger so that said plunger and said movable terminal member are as a unit normally spring-urged toward said power piston.

6. A servo-motor according to claim 2 wherein said casing of said failure sensing switch means further comprises a cavity formed therein, said stationary terminal member extending into said cavity and further comprising an insulating member disposed upon and partially covering and partially exposing an end portion of said stationary terminal disposed within said cavity such that said stationary terminal is electrically connected and disconnected from said movable terminal member upon movement of said movable terminal member.

* * * * *